July 23, 1940.   J. E. KERNODLE ET AL   2,208,697
CURB CLEARANCE SIGNAL DEVICE FOR AUTOMOBILES
Filed Nov. 14, 1938
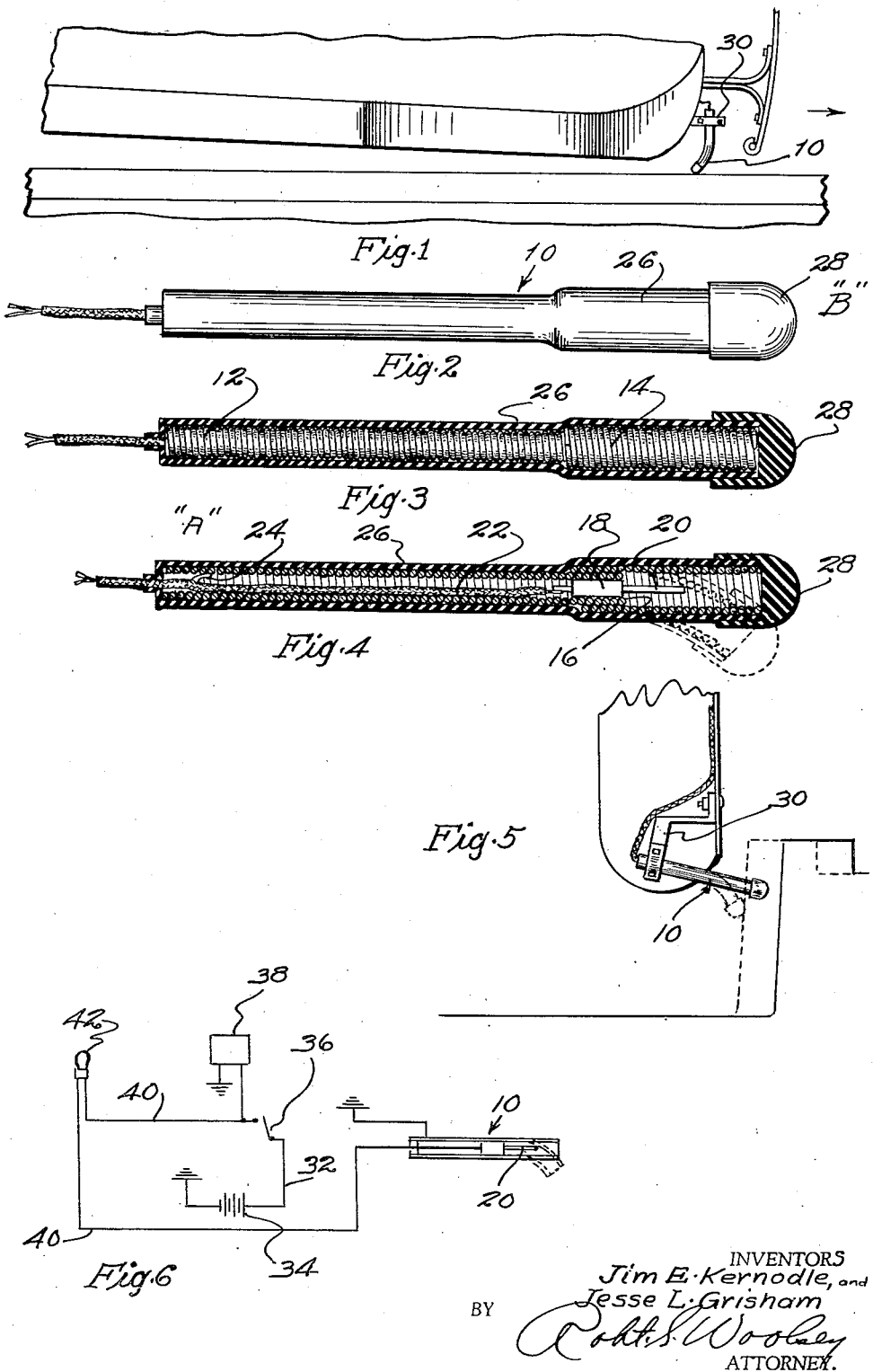
INVENTORS
Jim E. Kernodle, and
Jesse L. Grisham
BY
Robt. S. Wooley
ATTORNEY.

Patented July 23, 1940

2,208,697

UNITED STATES PATENT OFFICE 2,208,697

CURB CLEARANCE SIGNAL DEVICE FOR AUTOMOBILES

Jim E. Kernodle, Manhattan Beach, and Jesse L. Grisham, Hermosa Beach, Calif.

Application November 14, 1938, Serial No. 240,332

1 Claim. (Cl. 200—52)

Inconvenience in parking automobiles adjacent sidewalk curbing is a matter of common experience, and inability to definitely know the amount of clearance between such curbing and the vehicle being parked results in scraped, bent and marred mud-guards which in the aggregate in the amount of an annual repair bill which must of necessity total many thousands of dollars.

In view of the abovementioned inconvenience to which a driver is put, and the ever present likelihood of property damage to the automobile being parked adjacent the curbing of a street, the device of the present invention been developed to indicate to a driver that the vehicle has been maneuvered dangerously close to such curbing or other obstacle, and thus being fore-warned steps may be taken to prevent collision with and damage from colliding with such obstruction.

It is accordingly a prime object of the present invention to provide a simple, reliable, practical and low cost signal device to indicate to a driver of an automobile the fact that the vehicle is in danger of colliding with an adjacent curb or other obstacle.

A further object of the invention is to provide a signal device for the purpose stated which is rugged and which is adapted to be subjected to great strain and deformation, yet due to inherent features of construction will always return to functional normality upon removal of pressure therefrom.

Further objects, features, and advantages of the invention may be apparent from the accompanying drawing, the specification, and the appended claim.

In the drawing of which there is one sheet:

Figure 1 is a utility view showing one form of application of the invention to a motor vehicle and the manner of using the same to indicate proximity of a curbing.

Figure 2 is a side-view of the device of this invention.

Figure 3 is a longitudinally view partially in section showing construction.

Figure 4 is a longitudinal view in vertical midsection showing construction.

Figure 5 is a further view showing still another mode of securing the device upon a motor vehicle and showing that the device is inoperative unless brought into collision with an obstacle, and further showing one position assumed upon such collision.

Figure 6 is a simple wiring diagram showing a circuit designed to carry a warning signal to the driver of a vehicle that he is in danger of collision with the curbing or other obstacle.

The device of this invention 10 comprises a suitable length of closely wound steel spring 12 which is provided with and adapted to receive a shorter length of coil spring 14 preferably formed of a material having a high electrical conductive value, such as brass, and which latter spring is of such size as to have its convolutions nested within or between the convolutions of the spring 12 in such manner as to approximate a threaded relationship between the two springs 12 and 14. It is only necessary that the springs be engaged to degree sufficient to provide a firm and positive grip one upon the other, and to this end it is desirable that the spring 14 be of slightly smaller size than would ordinarily be necessary to merely bring the springs into the aforementioned relationship, for by thus slightly reducing the spring 14 in size it is necessary that it be slightly sprung in order to be fitted upon spring 12, thereby ensuring a firm and positive fit between the parts.

Adjacent the inner end 16 of spring 12 and positioned within the coils of the spring, I place a bushing 18 of dielectric material such as Bakelite which is adapted to support and insulate a metal rod 20 from normal contact with the coils or turns of spring 12, while the free end of the rod 20 is centrally positioned with and held in spaced relation to the inner walls of the spring 14, see Figure 4.

An electrical lead 22 is suitably secured to the inner end of rod 20 as by soldering, and extends from the end A of the spring. However a lead 24 may be soldered or otherwise suitably secured to the spring 12 for the purpose of completing an electrical circuit as will be hereinafter set forth.

A rubber tubular sheathing 26 extends over the exterior sides of the springs 12 and 14 to protect the same from foreign matter, while a heavy rubber thimble 28 is fitted over the end B of the device, not only to provide further protection against foreign matter, but also to provide a buffer to protect the device from undue wear when brought into sliding contact with a curb or other rough surface.

The sheathing 26 may be extended over the end A in any suitable manner to complete the weather protection of the device.

In order to suitably support the device in operative position, resort is made to bracket mounting for the same.

Obviously there are many ways of mounting the device in operative position, and many types of bracket which are inherently suited for the purpose, suffice to state that any bracket which will firmly hold the device in substantially horizontal position and in such manner that the end B thereof, projects to a maximum of three inches beyond the outside of the mud-guard, although such clearance in practice would be regulated by the motor vehicle laws of the several states. The degree of clearance being the measure of clearance between the vehicle and the curb or other obstacle to be avoided.

Application of the device is believed to be quite obvious, however the following statement may be of assistance in better understanding the application and use of the device.

After clamping the device in position by use of brackets 30 to either the forward and rear mud-guards or either one in such manner as to cause the device to extend outwardly a reasonable distance, the leads 22 and 24 are connected in the electrical circuit of the vehicle, one form of such circuit being shown in Figure 6. In Figure 6 a grounded form of circuit is shown in which a lead 32 extends from a battery 34 to an ignition key 36 thence to the coil 38, etc., of the ignition circuit. At the same time a lead 40 extends to a signal device such as a lamp 42, thence to the device 10 at which point it is connected to lead 22 while lead 24 may be grounded in common with other features of the circuit. This arrangement energizes the circuit to the device 10 upon closure of the ignition key 36 and permits lighting of the lamp 42 at any time the spring 14 is forcibly bent and brought into contact with the rod 20, thereby informing the driver of his maximum clearance from the curb or other object which intercepts the device 10.

Since the whole of the device 10 is formed of extensile springs and rubber it is obvious that the device will stand much abuse without harm being done. It has been found in practice that the device is highly satisfactory and reliable in its function of visually translating curb clearance to the driver of a motor vehicle.

In conclusion it may be stated that it is obvious that various changes and modifications may be made in practicing the invention in departure from the showing of the drawing and description as given, without however, departing from the true spirit of the invention as defined by the scope of the appended claim.

We claim:

A circuit closer comprising a length of closely wound helical spring wire, a second length of closely wound helical spring wire of such inner diameter as to be enabled to be screwed upon the exterior of said first mentioned length of helical spring wire, an insulated electrical conductor having an exposed end portion spaced from the inner sides of said second mentioned helical wire and adapted to be intermittently brought into contact with the inner sides of said second mentioned length of helical spring wire when it is bent laterally, a second conductor, said second conductor being electrically secured to the said first mentioned helical spring wire, and a weather seal formed of tubular rubber having an end portion of greater section than the remainder thereof to withstand abrasive action.

JIM E. KERNODLE.
JESSE L. GRISHAM.